United States Patent [19]    [11] 3,791,888
Hudson    [45] Feb. 12, 1974

[54] SOLID PROPELLANTS PREPARED FROM ACIDIC VINYLIDENE POLYMERS USING BOTH POLYAZIRIDINYL AND DIFUNCTIONAL AZIRIDINYL CURING AGENTS

[75] Inventor: Paul S. Hudson, Bartlesville, Okla.
[73] Assignee: Phillips Petroleum Company, Bartlesville, Okla.
[22] Filed: Jan. 23, 1961
[21] Appl. No.: 84,450

[52] U.S. Cl.................................. 149/19, 149/20
[51] Int. Cl.............................................. C06d 5/06
[58] Field of Search. 52/0.5 S; 260/551, 534; 149/7, 149/18, 19, 20

[56] References Cited
UNITED STATES PATENTS
3,147,161   9/1964   Abere et al............................ 149/19

Primary Examiner—Benjamin R. Padgett

EXEMPLARY CLAIM

1. A solid propellant composition comprising an inorganic oxidizing salt and a synthetic polymer formed by reacting an uncured polymer of a vinylidene-containing monomer selected from the group consisting of conjugated dienes containing from four to 12 carbon atoms, vinyl-substituted aromatic compounds, vinylpyridines, vinylquinolines, vinylisoquinolines, acrylic acid esters, alkacrylic acid esters, nitriles, N,N-disubstituted amides, vinylfuran, and N-vinylcarbazole, said uncured polymer containing at least one acid group of an element selected from the group consisting of sulfur, carbon, selenium, silicon, tin, antimony, tellurium, and arsenic per molecule, with a combination curative containing a compound having at least three 1-aziridinyl radicals in which the ring carbons are bonded to radicals containing up to a total of 20 carbon atoms and selected from the group consisting of hydrogen, alkyl, cycloalkyl, aryl, alkaryl and aralkyl radicals and a diaziridinyl compound having the formula

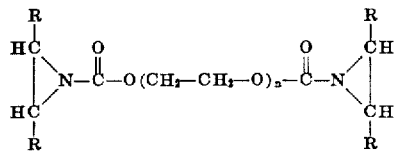

wherein $n$ is an integer of 1 to 2 and each R is selected from the group consisting of hydrogen and alkyl radicals containing from one to four carbon atoms.

15 Claims, No Drawings

SOLID PROPELLANTS PREPARED FROM ACIDIC VINYLIDENE POLYMERS USING BOTH POLYAZIRIDINYL AND DIFUNCTIONAL AZIRIDINYL CURING AGENTS

This invention relates to improved solid propellants. In another aspect it relates to an improved method of curing the rubbery binder of a composite propellant and to the resulting propellant composition which has improved physical properties, particularly enhanced elongation at low temperatures.

In the past 15 years or so, great interest has developed in solid propellants for jet propulsion devices such as missiles, rocket motors, gas generators, and the like. One type of solid propellant which has received considerable attention is that of the composite type, a typical composite propellant being one that uses an organic material as the fuel and binder, and a solid oxidant such as ammonium nitrate. In this type of propellant particularly when the propellant comprises a major proportion of a crystalline oxidizer and a minor proportion of the fuel and binder, the problem is presented of adjusting the physical properties of the propellant because of the small proportion of the binder material. Thus, it is difficult to provide suitable adhesion to the particles of oxidizer and the matrix of binder material is so tenuous that it is difficult to provide sufficient strength and elasticity in the propellant structure. Also in many cases it is desirable and necessary to be able to cast or pour the propellant into a rocket case or mold and then cure to a solid having suitable properties. In addition, since the binder also forms a fuel or part of the fuel it must have suitable chemical properties for this purpose.

It has been disclosed in the copending application of P. S. Hudson and C. C. Bice, Ser. No. 829,462, filed July 24, 1959 that an improved binder for a composite solid propellant can be provided from a synthetic polymer or copolymer containing terminal acidic groups or a synthetic copolymer of an unsaturated carboxylic acid which has been reacted with a tri(aziridinyl)phosphine oxide or a tri(aziridinyl)phosphine sulfide. In a preferred method of manufacturing a solid propellant grain the uncured propellant composition is poured into a case or mold as a fluid mass and subsequently cured to a resilient solid. The binder in such a casting operation must be quite fluid prior to curing and a high degree of cure is required in order to convert the polymer which is fluid to a solid with acceptable strength. Cured propellant grains must have sufficient mechanical strength to withstand the stress of handling and enormous thrusts encountered in use, as well as resiliency to resist cracking. These properties must be acceptable over a very wide range of temperature and for long periods of time.

In the copending application of John E. Mahan, Ser. No. 55,602 filed Sept. 12, 1960, an improvement in curing polymers containing acidic groups by using a combination of a trifunctional aziridinyl compound and a difunctional aziridinyl compound is disclosed. I have now discovered an improved solid propellant composition which comprises an inorganic oxidizing salt and a synthetic solid polymer formed by reacting in admixture with said salt an uncured polymer of vinylidene containing monomers; said uncured polymer containing at least one acidic group per molecule, with a combination curative which contains a polyaziridinyl compound and a difunctional aziridinyl compound which is either an ethylene or diethylene glycol bis(alkylene)-carboxamide. I have discovered that these difunctional aziridinyl compounds provide propellant compositions of unexpectedly improved elongation properties at very low temperatures, for example, at $-40°$ to $-70°$ F., without substantial sacrifice in tensile strength at the higher temperatures which the propellant may encounter during storage prior to combustion. In addition to enjoying the benefits of this improved elongation at low temperatures, the compositions of my invention can be controlled in the amount of cross-linking which occurs by regulating the relative proportions of the difunctional and polyfunctional aziridinyl compounds as disclosed in the above-mentioned copending application of John E. Mahan. These difunctional aziridinyl compounds which provide the improved low temperature elongation properties are defined by the formula:

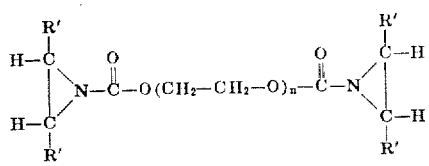

wherein $n$ is the integer of 1 to 2 and each $R'$ is selected from the group consisting of hydrogen and alkyl radicals containing from one to four carbon atoms. Further, according to my invention, these improved propellant compositions can be formed by mixing the uncured polymer containing the combination curative with an inorganic oxidizing salt and then heating the mixture at a temperature in the range of 100° to 300° F. for a sufficient time to cure the polymer and form a solid propellant. In this disclosure and in the claims, the term "polyfunctional" is used to describe reactants with more than two functional groups per molecule, for example, from three to six or more aziridinyl groups per molecule.

It is an object of my invention to provide an improved solid propellant.

Another object of my invention is to provide an improved method of curing the rubbery binder in a composite propellant, said binder being a synthetic polymer or copolymer which contains at least one acidic group per molecule.

Another object is to provide an improved propellant composition which has increased elongation at relatively low temperatures.

Still another object of my invention is to provide a method of controlling the physical properties of a solid propellant by manipulating the relative proportions of ingredients used in the curing system and thereby obtain improvements in low temperature elongation without substantial sacrifice in the tensile strength of the composition at higher temperatures.

Other objects, advantages and features of my invention will be apparent to those skilled in the art from the following discussion.

The novel solid propellants of this invention comprise an inorganic oxidizing salt and a synthetic polymer or copolymer containing terminal acidic groups or a synthetic rubbery copolymer of an unsaturated carboxylic acid which has been reacted with a combination of a polyfunctional aziridinyl compound and an ethylene or diethylene glycol bis(alkylene)-carboxamide. Particularly useful inorganic oxidizing salts include the ammonium, alkali metal, and alkaline earth metal salts of nitric, perchloric anc chloric acids and mixtures thereof such as sodium perchlorate, potassium perchlorate, magnesium perchlorate, ammonium perchlorate, lithium chlorate, strontium chlorate, potassium nitrate, sodium nitrate, calcium nitrate, ammonium nitrate and the like.

The polymers which are utilized in the solid propellants of this invention comprise polymers prepared from a wide variety of materials. These materials include conjugated dienes containing from four to 12 carbon atoms, preferably four to eight carbon atoms such as 1,3-butadiene, isoprene, piperyline, methyl pentadiene, 2-ethyl-1,3-butadiene, phenylbutadiene, 3,4-dimethyl-1,3-hexadiene, 4,5-diethyl-1,3-octadiene, and the like. Conjugated dienes containing halogen and alkoxy substituents along the chain can also be employed, such as chloroprene and 2-ethoxy-3-ethyl-1,3-butadiene. The conjugated dienes can be polymerized alone or in admixture with each other to form copolymers or block copolymers. The preferred conjugated dienes are the diolefins, butadiene, isoprene and piperyline.

In addition to the conjugated dienes other monomers containing a vinylidine group such as the vinyl-substituted aromatic compound can be employed. These vinyl-substituted aromatic compounds include styrene, 1-vinylnaphthalene, 2-vinylnaphthalene, and the alkyl, cycloalkyl, aryl, alkaryl, aralkyl, alkoxy, aryloxy, and dialkylamino derivatives thereof in which the total number of carbon atoms in the combined constituents is generally not greater than 12. These compounds can also be used to form homopolymers or copolymers including block copolymers with each other or with conjugated dienes. The presence of a small amount of polar compound, such as diethyl ether, encourages random copolymerization between conjugated dienes and vinyl-substituted aromatic compounds when employing an organo dilithium initiator. Certain polar monomers can also be employed to form homopolymers or copolymers with each other or to form block copolymers with the conjugated dienes and/or vinyl-substituted aromatic compounds. These polar monomers include vinylpyridines and vinylquinolines in which the vinyl group is attached to a ring carbon other than a carbon in the beta position with respect to the nitrogen. These pyridine, quinoline, or isoquinoline derivatives can contain substituents such as alkyl, cycloalkyl, aryl, alkaryl, aralkyl, alkoxy, aryloxy, and dialkylamino groups in which the total number of carbon atoms in the combined substituents does not exceed 12. Any alkyl groups on the alpha or gamma carbons with respect to the nitrogen should be tertiary-alkyl groups. Examples of such polar monomers include 2-vinylpyridine, 4-vinylpyridine, 5-cyclohexyl-2-vinylpyridine, 6-methoxy-2-vinylpyridine, 4-vinylquinoline, 1-vinylisoquinoline, 4-phenyl, 1-vinylisoquinoline, and the like. Other polar monomers which can be used include the acrylic and alkacrylic acid esters, nitriles, and N,N-disubstituted amides, such as methyl acrylate, ethyl acrylate, ethyl methacrylate, acrylonitrile, N,N-dimethyl acrylamide, and the like. Vinyl furan and N-vinylcarbazole can also be used.

The terminally reactive polymers which are preferred for this invention are prepared by contacting the monomer or monomers above described with an organo alkali metal compound containing from one to four and preferably two alkali metal atoms, preferably lithium atoms, per molecule. Polymers which are formed thereby can be represented by the general formula $QM_n$ where Q comprises the polymer as previously described, M is an alkali metal, and $n$ is an integer of 1 to 4. The organo alkali metal initiators can be represented by the formula $RM_x$ where R is a hydrocarbon radical selected from the group consisting of aliphatic, cycloaliphatic, and aromatic radicals, M is an alkali metal, and $x$ is an integer of 1 to 4. The R in the formula generally contains from one to 20 carbon atoms. Preferred initiators of this type include the lithium adducts of naphthalene, methylnaphthalene, or anthracene, and 1,2-dilithio-1,2-diphenylethane gives particularly good results. Polymers having a single terminally reactive group can be formed using n-butyllithium as the initiator. Other preferred initiators are the dilithium adducts of 2,3-dialkyl-1,3-butadienes, for example, 2,3-dimethyl-1,3-butadiene, and the dilithium adducts of isoprene or 1,3-butadiene wherein the adduct contains from 1 to 7 diene units per molecule.

Generally the polymers formed with these initiators are liquids having molecular weights ranging from 1,000 to about 20,000, depending upon the amount of initiator employed. Semisolid and solid terminally reactive polymers can be prepared having high molecular weights up to 150,000 or higher. Usually the initiator level is between about 0.25 and about 100 millimols per 100 grams of monomer.

The temperature of the polymerization is generally in the range of −100° to +150° C., preferably between −75° and +75° C. The polymerization should be carried out in the presence of an inert diluent and hydrocarbon diluents such as paraffins, cycloparaffins, and aromatics containing from four to 10 carbon atoms per molecule are preferred. Examples of such diluents include benezene, toluene, cyclohexane, methylcyclohexane, n-heptane, isooctane, and the like.

Polymers prepared as hereinbefore set forth contain an alkali metal atom on at least one end and preferably on two ends of the polymer chain and the organic radical of the initiator is incorporated in the polymer chain. These terminally reactive polymers when treated with suitable reagents such as carbon dioxide, sulfuryl chloride, and the like and thereafter hydrolyzed provide polymers containing terminal acidic groups. The acidic groups which can be incorporated in polymers of this type include groups such as $SOH$, $SO_2H$, $SO_3H$, $COOH$, $SeO_2H$, $SeO_3H$, $SiO_2H$, $SnO_2H$, $SbOH$, $SbO_3H_2$, $TeO_2H$, $TeO_3H$, $AsO_2H$, $AsO_2H$, $AsOH$, $AsO_3H_2$, $AsO_3H_3$. The temperature of this reaction can vary over a wide range, for example, from −75° to +75° C. and preferably the amount of the reagent is in excess of stoichiometric.

The monomers hereinbefore described for use in preparation of terminal reactive polymers containing alkali metal atoms can also be reacted with unsaturated carboxylic acids to provide liquid polymers suitable for use in carrying out the invention. Unsaturated carboxylic acids which can be employed include acids containing up to 36 carbon atoms, from one to five double bonds and one or two carboxyl groups. Also included are the so-called "dimerized" acids, i.e., where two molecules of an acid are linked by destroying one of the double bonds. Illustrative of specific acids which can be used are acids such as acrylic acid, methacrylic acid, itaconic acid, vinylacetic acid, palmitoleic acid, oleic acid, ricinoleic acid, arachidonic acid, erucic acid, selacholeic acid, fumaric acid, maleic acid, and the like. Reaction of the monomer with the unsaturated carboxylic acid can be carried out over a wide range of temperatures depending on the particular monomer and the particular acid employed; e.g., at temperatures between about −50° and about +100° C. The amount of acid employed in the reaction can vary to provide polymers having an acid equivalence of from as low as 0.005 to as high as 0.2 equivalents per 100 grams of polymer product.

The polyfunctional curing agents used in my invention include compounds containing at least three aziridinyl groups and preferably either three or six aziridinyl groups per molecule. For example, typical of such polyfunctional compounds are tri(aziridinyl)phosphine oxides or sulfides which are represented by the formula:

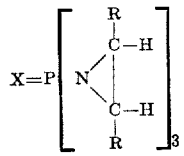

wherein X is selected from the group consisting of oxygen and sulfur, P is phosphorous, the R's are radicals containing up to a total of 20 carbon atoms selected from the group consisting of hydrogen, alkyl, cycloalkyl, aryl, alkaryl and aralkyl radicals and the R's can be unlike. Specific phosphine reactants which can be used include tri(1-aziridinyl)phosphine oxide, tri(2-methyl-1-aziridinyl)phosphine oxide, tri(2,3-dimethyl-1-aziridinyl)phosphine oxide, tri(2-isopropyl-1-aziridinyl)phosphine oxide, tri(2-methyl-3-ethyl-1-aziridinyl)phosphine oxide, tri(2-isopropyl-1-aziridinyl)phosphine oxide, tri(2-methyl-3-n-butyl-1-aziridinyl)phosphine oxide, tri(2-hexyl-1-aziridinyl)-phosphine oxide, tri(2,3-diheptyl-1-aziridinyl)phosphine oxide, tri(2-methyl-3-octyl-1-aziridinyl)phosphine oxide, tri(2-ethyl-3-decyl-1-aziridinyl)phosphine oxide, tri(2-dodecyl-1-aziridinyl)phosphine oxide, tri(2-methyl-3-tridecyl-1-aziridinyl)phosphine oxide, tri(2-ethyl-3-octadecyl-1-aziridinyl)phosphine oxide, tri(2-eicosyl-1-aziridinyl)phosphine oxide, tri(2-methyl-3-cyclopentyl-1-aziridinyl)phosphine oxide, tri(2-ethyl-3-cyclohexyl-1-aziridinyl)phosphine oxide, tri[2-n-butyl-3-(4-methylcyclohexyl)1-aziridinyl]phosphine oxide, tri(2-phenyl-1-aziridinyl)phosphine oxide, tri(-2-phenyl-3-tetradecyl-1-aziridinyl)phosphine oxide, tri(2,3-diphenyl-1-aziridinyl)phosphine oxide, tri(2-tert-butyl-3-phenyl-1-aziridinyl)phosphine oxide, tri[2-ethyl-3-(1-naphthyl)1-aziridinyl]phosphine oxide, tri[-2-n-propyl-3-(2-naphthyl)1-aziridinyl]phosphine oxide, tri(2-methyl-3-benzyl-1-aziridinyl)phosphine oxide, tri(2-nonyl-3-benzyl-1-aziridinyl)phosphine oxide, tri[2-n-propyl-3-(2-phenylethyl)1-aziridinyl]phosphine oxide, tri[2-methyl-3-(4-methylphenyl)1-aziridinyl]phosphine oxide, tri[2-ethyl-3-(3-n-propylphenyl)1-aziridinyl]phosphine oxide, tri[2-heptyl-3-(2,4-dimethylphenyl)1-aziridinyl]phosphine oxide, tri(1-aziridinyl)phosphine sulfide, tri(2-methyl-1-aziridinyl)phosphine sulfide, tri(2,3-dimethyl-1-aziridinyl)phosphine sulfide, tri(2,3-diethyl-1-aziridinyl)-phosphine sulfide, tri(2-methyl-3-isopropyl-1-aziridinyl)phosphine sulfide, tri-(2-tert-butyl-1-aziridinyl)phosphine sulfide, tri(2,3-didecyl-1-aziridinyl)phosphine sulfide, tri(2-ethyl-3-pentadecyl-1-aziridinyl)phosphine sulfide, tri(2-eicosyl-1-aziridinyl)phosphine sulfide, tri(2-methyl-3-cyclohexyl-1-aziridinyl)-phosphine sulfide, tri(2-phenyl-1-aziridinyl)phosphine sulfide, tri(2-phenyl-3-benzyl-1-aziridinyl)phosphine sulfide, tri(2,3-diphenyl-1-aziridinyl)phosphine sulfide, tri(2-ethyl-3-phenyl-1-aziridinyl)phosphine sulfide), and tri(2-amyl-3-benzyl-1-aziridinyl)phosphine sulfide.

Examples of other polyfunctional aziridinyl compounds are the aziridinyl-substituted triazines and tri-phosphatriazines, for example, the 1-aziridinyl-1,3,5-triazines and the 1-aziridinyl-2,4,6-triphospha-1,3,5-triazines represented by the formulas

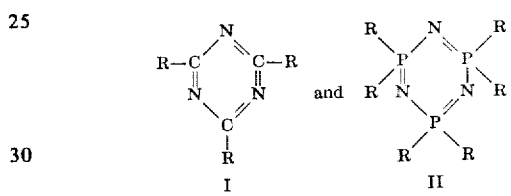

where R is a radical selected from the group consisting of a 1-aziridinyl radical which can be represented by the formula

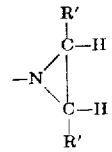

hydrogen, an alkyl, cycloalkyl, aryl aralkyl, and alkaryl radical, each hydrocarbon radical containing from one to 12 carbon atoms, and the R' radicals are selected from the group consisting of hydrogen, alkyl, cycloalkyl, aryl, aralkyl, and alkaryl radicals, and R' can be alike or different, the R's in each aziridinyl radical containing up to and including a total of 20 carbon atoms. In the foregoing formulas, at least three of the R groups are 1-aziridinyl radicals. Thus, each of the R groups in formula I is an aziridinyl radical.

Examples of the compounds represented by formula I are:

2,4,6-tri(1-aziridinyl)1,3,5-triazine
2,4,6-tri(2-methyl-1-aziridinyl)1,3,5-triazine
2,4,6-tri(2-methyl-3-ethyl-1-aziridinyl)1,3,5-triazine
2,4,6-tri(2-ethyl-3-octadecyl-1-aziridinyl)1,3,5-triazine
2,4,6-tri(2-methyl-3-cyclopentyl-1-aziridinyl)1,3,5-triazine
2,4,6-tri(2-phenyl-1-aziridinyl)1,3,5-triazine
2,4,6-tri(2,3-diphenyl-1-aziridinyl)1,3,5-triazine
2,4,6-tri(2-n-propyl-3-(2-phenylethyl)1-aziridinyl)1,3,5-triazine 2,4,6-tri(2-methyl-3-(4-methylphenyl)1-
aziridinyl)1,3,5-triazine and the like.

Examples of compounds represented by formula II include the following:

2,4,6-tri(1-aziridinyl)2,4,6-triphospha-1,3,5-triazine 2,4,6-tri(2-methyl-3-n-butyl-1-aziridinyl)2,4,6-triphospha-1,3,5-triazine
2,4,6-tri(2-ethyl-3-cyclohexyl-1-aziridinyl)2,4,6-triphospha-1,3,5-triazine
2,4,6-tri(2-n-propyl-3-(2-phenylethyl)1-aziridinyl)2,4,6-triphospha1,3,5-triazine
2,4,6-tri(2-heptyl-3-(2,4-dimethylphenyl)1-aziridinyl)2,4,6-triphospha-1,3,5-triazine
2,2,4,4,6,6-hexa(2-methyl-1-aziridinyl)2,4,6-triphospha-1,3,5-triazine, hereinafter referred to as hexa-2-methyl-1-aziridinyltriphosphatriazine,
2,2,4,6-tetra(2-hexyl-1-aziridinyl)2,4,6-triphospha-1,3,5-triazine, and the like.

The difunctional aziridinyl compounds employed in the combined curative system of this invention are the ethylene and diethylene glycol bis(alkylene)-carboxamides having the formula as previously indicated. Examples of these compounds include ethylene glycol bis(1,2-propylene)-carboxamide, diethylene glycol-bis(1,2-propylene)-carboxamide, ethylene glycol bis(2-methyl-1,2-propylene)-carboxamide, ethylene glycol bis(2,3-butylene)-carboxamide, ethylene glycol bis(1,2-ethylene)-carboxamide, ethylene glycol bis(2,3-pentylene)-carboxamide, diethylene glycol bis(1,2-ethylene)-carboxamide, diethylene glycol bis(3-methyl-2,3-pentylene)-carboxamide, diethylene glycol bis(5-methyl-2,3-hexylene)-carboxamide, and the like. Such compounds can be prepared, for example by reacting diethylene glycol or ethylene glycol with two mols of phosgene and then reacting the resulting dicarboxy chloride with 1,2-propyleneimine.

In accordance with my invention a terminally reactive liquid polymer is admixed with a polyfunctional aziridinyl compound, a difunctional aziridinyl compound and an inorganic oxidizing salt, after which the mixture is suitably increased in temperature, such that reaction occurs between the polymer and the aziridinyl compounds to provide a solid propellant structure. In the preparation of the binder from liquid polymer, the polymer and aziridinyl compounds are placed in a suitable dispersant-type mixer and thoroughly mixed for a period of 1 to 10 minutes. The oxidizer, which is finely powdered to a size in the range of from 1 to 300 microns, is then added and mixing is continued for a period of 15 to 45 minutes under vacuum. During the latter mixing step, the temperature is gradually increased to a temperature between about 100° to 300° F, preferably between about 150° and 200° F. The material at this stage is a viscous slush, which is then poured into a rocket case or suitable mold. The filled mold is then placed in an oven and cured for 24 to 48 hours or more at temperatures in the range of 150° to 200° F. Semi-solid polymers can be blended with the aziridinyl compounds and oxidizer, and the mixture extruded to form a curable propellant grain.

In general the curing agents will comprise from 10 to 90 percent difunctional compounds and preferably from 30 to 70 percent difunctional aziridinyl compound. The total amount of curative used is preferably about stoichiometric to somewhat above stoichiometric, for example, about 125 percent of the stoichiometric amount of curative based upon the acid equivalents of the polymers. With polymers in the lower range of equivalents amounts of curative up to 150 percent of stoichiometric can be readily employed and with the polymers in the higher range of acid equivalents, as low as 10 percent of the stoichiometric amount of curative is effective. When using the lower amounts of curative the excess carboxyl groups, for example, are useful in developing adherence to surfaces such as the rocket cases, oxidizer particles or to glass or ceramic surfaces.

The solid propellants of this invention can contain in addition to the binder fuel a powder metal such as aluminum and various compounding ingredients commonly employed in making composite propellants, such as plasticizers, oxidation inhibitors, reinforcing agents, wetting agents, modifiers, vulcanizing agents, curing agents, accelerators, burning rate catalysts, and the like. The propellant composition can be formed into a grain having any desired shape or geometry, such as grains of the internal, external and internal-external burning types. These grains can be molded or extruded and can be restricted with any suitable and well-known restricting material, such as rubber.

The propellants of this invention can contain a powdered metal, for example, aluminum, boron, magnesium, beryllium, and the like. Alloys can also be used such as the aluminum alloys of boron, magnesium, manganese, copper and the like. Silicon can also be utilized and the term "metal" is used herein to include silicon. Generally the components of the solid propellant compositions of this invention are present in the relative amounts set forth in Table I.

TABLE I

| Component | Weight per cent |
|---|---|
| Inorganic oxidizing salt | 75–90 |
| Acidic polymer | 10–25 |
| Powdered metal | 0–25 |

Various types of compounding ingredients including fillers such as carbon black and mineral fillers can be incorporated in the polymer prior to reaction of the polymer with the aziridinyl compounds. Where it is desired to closely control the burning rate of the propellant composition suitable burning rate catalysts can be incorporated therein. These catalysts include materials such as ferrocyanides sold under various trade names, such as Prussian blue, Steel blue, Bronze blue, Turnbull's blue, Chinese blue, New blue, Antwerp blue, Mineral blue, Paris blue, Berlin blue, Hamburg blue, Williamson blue, and the like. Other useful burning rate catalysts include copper chromite, ammonium dichromate, potassium dichromate, sodium dichromate, and the like.

The advantages of my invention are illustrated by the following examples. In these examples, specific conditions and materials given are presented as being typical and should not be construed to limit my invention unduly.

EXAMPLE I

Polybutadiene containing two terminal carboxy groups per molecule was prepared by reacting 100 parts by weight of 1,3-butadiene in 1,350 parts by weight of cyclohexane in the presence of 45 millimols of lithium methylnaphthaleneisoprene adduct for 1 hour at a temperature of 122° F. The cyclohexane, butadiene, and initiator were charged to a reactor and a mixture was maintained in a constant temperature bath with stirring for one hour. Diethyl ether was then added to help fluidize the polymer solution and the solution was contacted with an excess of dry carbon dioxide. The resultant mixture was diluted with hydrochloric acid, washed, and then dried. One per cent phenyl-beta-naphthylamine was added to the recovered polymer as an antioxidant. The viscosity of the polymer was 2.16 poise and the carboxy content was 2.01 per cent. Propellant compositions were then formed from this polymer and ammonium perchlorate which was a mixture of 70 percent 200 micron particles, and 30 percent 18 micron particles.

PROPELLANT A

| Polymer | 19.28 wt. % |
|---|---|
| MAPO (110% Stoichiometric) (1) | 0.72 |
| Ammonium perchlorate | 80.00 |

PROPELLANT B

| Polymer | 19.07 wt. % |
|---|---|
| MAPO (55% Stoichiometric) | 0.36 |
| Phenyl-MAPO (55% Stoichiometric) (2) | 0.57 |
| Ammonium Perchlorate | 80.00 |

PROPELLANT C

| Polymer | 19.10 wt. % |
|---|---|
| MAPO (55% Stoichiometric) | 0.36 |
| EGDPCA (55% Stoichiometric) (3) | 0.54 |
| Ammonium Perchlorate | 80.00 |

PROPELLANT D

| Polymer | 19.01 wt. % |
|---|---|
| MAPO (55% Stoichiometric) | 0.36 |
| DEGDPCA (55% Stoichiometric) (4) | 0.63 |
| Ammonium Perchlorate | 80.00 |

(1) Tri(2-methyl-1-aziridinyl)phosphine oxide
(2) Phenyl-bis(2-methyl-1-aziridinyl)phosphine oxide
(3) Ethylene glycol bis(1,2-propylene)-carboxamide
(4) Diethylene glycol bis(1,2-propylene)-carboxamide

TABLE II

Physical Properties of Propellants

| Propellant | Temp. °F | $S_m$ psi | $S_b$ psi | $Em$ % | $Eb$ % | Modulus of Elasticity psi |
|---|---|---|---|---|---|---|
| A | 170 | 83 | 75 | 8.3 | 9.9 | 1321 |
|  | 75 | 123 | 109 | 12.2 | 14.8 | 1537 |
|  | −40 | 371 | 339 | 18.8 | 23.9 | 4552 |
|  | −70 | 612 | 562 | 14.1 | 17.5 | 9340 |
|  | −90 | 801 | 647 | 7.2 | 11.3 | 21900 |
| B | 170 | 75 | 61 | 31.4 | 43.6 | 460 |
|  | 75 | 153 | 133 | 33.0 | 45.9 | 1200 |
|  | −40 | 485 | 463 | 28.1 | 32.6 | 5200 |
|  | −70 | 616 | 570 | 14.5 | 17.5 | 9700 |
|  | −90 | 771 | 615 | 7.3 | 11.6 | 21000 |
| C | 170 | 74 | 65 | 22.8 | 29.0 | 470 |
|  | 75 | 117 | 103 | 37.5 | 48.6 | 640 |
|  | −40 | 434 | 337 | 34.2 | 48.5 | 4700 |
|  | −70 | 648 | 593 | 13.2 | 21.5 | 9100 |
|  | −90 | 792 | 681 | 8.4 | 14.6 | 16000 |
| D | 170 | 70 | 58 | 28.7 | 37.1 | 380 |
|  | 75 | 131 | 113 | 55.2 | 68.0 | 450 |
|  | −40 | 453 | 414 | 47.9 | 57.9 | 4300 |
|  | −70 | 677 | 617 | 14.4 | 20.0 | 9200 |
|  | −90 | 793 | 681 | 8.7 | 13.1 | 15000 |

In the table above;

$S_m$ is the maximum tensile strength.
$S_b$ is the tensile strength at break.
$Em$ is the elongation corresponding to maximum tensile strength.
$Eb$ is the elongation at break.

As can be seen from the above date, use of the difunctional aziridinyl compound according to this invention in combination with the trifunctional aziridinyl compound provides a propellant composition of substantially improved elongation at very low temperatures. The most significant property in this respect is the elongation at break at temperatures of −40°, −70°, and 90° F.

As will be apparent to those skilled in the art from the above discussion and examples, modifications and variations can be made in my invention without departing from the spirit or scope thereof.

I claim:

1. A solid propellant composition comprising an inorganic oxidizing salt and a synthetic polymer formed by reacting an uncured polymer of a vinylidene-containing monomer selected from the group consisting of conjugated dienes containing from four –12 carbon atoms, vinyl-substituted aromatic compounds, vinylpyridines, vinylquinolines, vinylisoquinolines, acrylic acid esters, alkacrylic acid esters, nitriles, N,N-disubstituted amides, vinylfuran, and N-vinylcarbazole, said uncured polymer containing at least one acid group of an element selected from the group consisting of sulfur, carbon, selenium, silicon, tin, antimony, tellurium, and arsenic per molecule, with a combination curative containing a compound having at least three 1-aziridinyl radicals in which the ring carbons are bonded to radicals containing up to a total of 20 carbon atoms and selected from the group consisting of hydrogen, alkyl, cycloalkyl, aryl, alkaryl and aralkyl radicals and a diaziridinyl compound having the formula

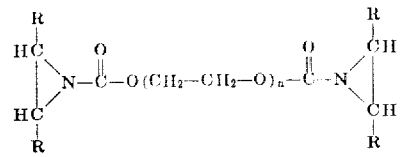

wherein $n$ is an integer of 1 to 2 and each R is selected from the group consisting of hydrogen and alkyl radicals containing from one to four carbon atoms.

2. The composition of claim 1 wherein said uncured polymer is a liquid polymer having from one to four of said acidic groups positioned terminally in the molecule.

3. The composition of claim 1 wherein said uncured polymer is a copolymer of vinylidene-containing monomers with unsaturated carboxylic acids having a maximum of 36 carbon atoms, from one to five double bonds and from one to two carboxyl groups.

4. A solid propellant composition comprising an inorganic oxidizing salt and a synthetic solid polymer formed by reacting in admixture with said salt an uncured polymer of vinylidene-containing monomers selected from the group consisting of conjugated dienes containing from four – 12 carbon atoms, vinyl-substituted aromatic compounds, vinylpyridines, vinylquinolines, vinylisoquinolines, acrylic acid esters, alkacrylic acid esters, nitriles, N,N-disubstituted amides, vinylfuran, and N-vinylcarbazole, said uncured polymer containing at least one acid group of an element selected from the group consisting of sulfur, carbon, selenium, silicon, tin, antimony, tellurium, and arsenic per molecule, with a combination of a trifunctional material having the formula

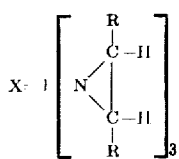

wherein X is selected from the group consisting of oxygen and sulfur, P is phosphorus, and each R is selected from the group consisting of hydrogen, alkyl, cycloalkyl, aryl, alkaryl, and aryl radicals, both R's containing up to a total of 20 carbon atoms, and a difunctional material having the formula

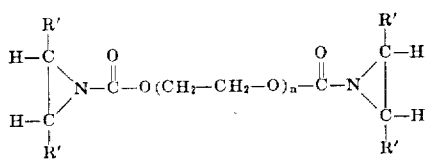

wherein $n$ is an integer of 1 to 2 and each R' is selected from the group consisting of hydrogen and alkyl radicals containing from one to four carbon atoms.

5. A solid propellant composition comprising about 75 to 90 weight per cent inorganic oxidizing salt and about 10 to about 25 weight per cent of a synthetic polymer formed by reacting in admixture with said salt an uncured polymer of a conjugated diene having from four to 12 carbon atoms per molecule and containing from two to four terminal carboxy groups per molecule with at least about a stoichiometric amount based on the acid equiValents of a combination curative containing 10 to 90 weight percent of a trifunctional material having the formula

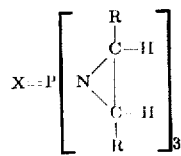

wherein X is selected from the group consisting of oxygen and sulfur, P is phosphorous, and each R is selected from the group consisting of hydrogen, alkyl, cycloalkyl, aryl, alkaryl, and aryl radicals, both R's containing up to a total of 20 carbon atoms, and 10 to 90 weight percent of a difunctional material having the formula

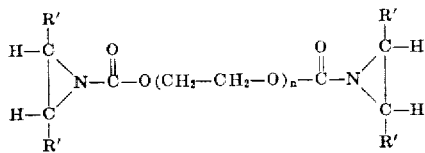

wherein $n$ is an integer of 1 to 2 and each R' is selected from the group consisting of hydrogen and alkyl radicals containing from one to four carbon atoms.

6. The composition of claim 5 wherein said polymer is polybutadiene prepared in the presence Of an organo dilithium initiator and containing two terminal carboxy groups per molecule, said trifunctional material is tri(2-methyl-1-aziridinyl)phosphine oxide, and said difunctional material is ethylene glycol bis(1,2-propylene)-carboxamide.

7. The composition of claim 5 wherein said salt is ammonium perchlorate, said polymer is a copolymer of butadiene and styrene prepared in the presence of an organo dilithium initiator and containing two terminal carboxy groups per molecule, said trifunctional material is tri(2-methyl-1-aziridinyl)phosphine oxide, and said difunctional material is diethylene glycol bis(1,2-propylene)-carboxamide.

8. A method of preparing a solid propellant composition which comprises forming a mixture of an inorganic oxidizing salt and an uncured polymer of vinylidene-containing monomers selected from the group consisting of conjugated dienes containing from four - 12 carbon atoms, vinyl-substituted aromatic compounds, vinylpyridines, vinylquinolines, vinylisoquinolines, acrylic acid esters, alkacrylic acid esters, nitriles, N,N-disubstituted amides, vinylfuran, and N-vinylcarbazole, said polymer containing at least one acid group of an element selected from the group consisting of sulfur, carbon, selenium, silicon, tin, antimony, tellurium, and arsenic per molecule, and curing said polymer by reacting same with the combination of a compound having at least three 1-aziridinyl radicals in which the ring carbons are bonded to radicals containing up to a total of 20 carbon atoms and selected from the group consisting of hydrogen, alkyl, cycloalkyl, aryl, alkaryl and aralkyl radicals and a diaziridinyl compound having the formula

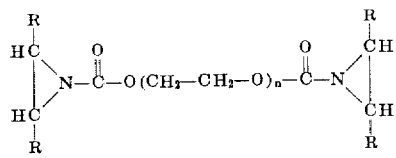

wherein $n$ is an integer of 1 to 2 and each R is selected from the group consisting of hydrogen and alkyl radicals containing from one to four carbon atoms.

9. A method of preparing a solid propellant composition which comprises forming a mixture of an inorganic oxidizing salt, an uncured polymer of vinylidene-containing monomers selected from the group consisting of conjugated dienes containing from four to 12 carbon atoms, vinyl-substituted aromatic compounds, vinylpyridines, vinylquinolines, vinylisoquinolines, acrylic acid esters, alkacrylic acid esters, nitriles, N,N-disubstituted amides, vinylfuran, and N-vinylcarbazole per molecule, a trifunctional material having the formula

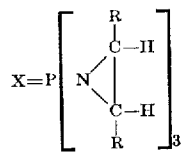

wherein X is selected from the group consisting of oxygen and sulfur, P is phosphorus, and each R is selected from the group consisting of hydrogen, alkyl, cycloalkyl, aryl, alkaryl, and aryl radicals, both R's containing up to a total of 20 carbon atoms and a difunctional material having the formula

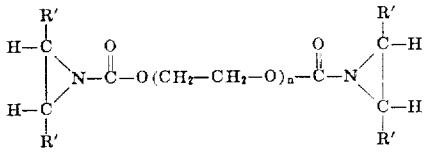

wherein $n$ is an integer of 1 to 2 and each R' is selected from the group consisting of hydrogen and alkyl radicals containing from one to four carbon atoms, and heating said mixture at a temperature in the range of 100° to 300° F for sufficient time to cure said polymer and form a solid propellant.

10. The method of claim 9 wherein said uncured polymer is a liquid polymer having from one to four of said acidic groups positioned terminally in the molecule.

11. The method of claim 9 wherein said uncured polymer is a copolymer of vinylidene-containing monomers with unsaturated carboxylic acids having a maximum of 36 carbon atoms, from one to five double bonds and from one to two carboxyl groups.

12. A method of preparing a solid propellant composition which comprises forming a mixture containing about 75 to 90 weight percent inorganic oxidizing salt, about 10 to 25 weight percent of a liquid polymer of a conjugated diene containing four to 12 carbon atoms per molecule, said polymer having been prepared in the presence of an organo dilithium initiator and containing two terminal carboxy groups per molecule, and at least about a stoichiometric amount based on the acid equivalents of a combination curative containing 10 to 90 weight percent of a trifunctional material having the formula

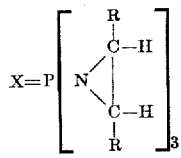

wherein X is selected from the group consisting of oxygen and sulfur, P is phosphorus, and each R is selected from the group consisting of hydrogen, alkyl, cycloalkyl, aryl, alkaryl, and aryl radicals, both R's containing up to a total of 20 carbon atoms, and 10 to 90 weight percent of a difunctional material having the formula

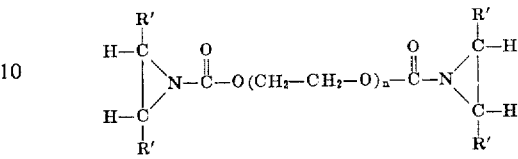

wherein $n$ is an integer of 1 to 2 and each R' is selected from the group consisting of hydrogen and alkyl radicals containing from one to four carbon atoms, and heating said mixture at a temperature in the range of 100° to 300° F for sufficient time to cure said polymer and form a solid propellant.

13. The method of claim 12 wherein said salt is ammonium perchlorate, said polymer is polybutadiene, said trifunctional material is tri(2-methyl-1-aziridinyl)phosphine oxide, and said difunctional material is ethylene glycol bis(1,2-propylene)-carboxamide.

14. The method of claim 12 wherein said salt is ammonium perchlorate, said polymer is polybutadiene, said trifunctional material is tri(2-methyl-1-aziridinyl)phosphine oxide, and said difunctional material is diethylene glycol bis(1,2-propylene)-carboxamide.

15. The method of claim 12 wherein said mixture is poured as a slush into a rocket case and cured in situ.

* * * * *

UNITED STATES PATENT OFFICE
CERTIFICATE OF CORRECTION

Patent No. 3,791,888  Dated February 12, 1974

Inventor(s) Paul S. Hudson

It is certified that error appears in the above-identified patent and that said Letters Patent are hereby corrected as shown below:

Column 12, line 46, "said polymer containing at least one acid group of an element selected from the group consisting of sulfur, carbon, selenium, silicon, tin, antimony, tellurium, an arsenic" should be inserted after "N-vinylcarbazole".

Signed and sealed this 4th day of June 1974.

(SEAL)
Attest:

EDWARD M. FLETCHER, JR.
Attesting Officer

C. MARSHALL DANN
Commissioner of Patents